(12) United States Patent
Nagano et al.

(10) Patent No.: US 11,327,470 B2
(45) Date of Patent: May 10, 2022

(54) UNIT SPACE GENERATING DEVICE, PLANT DIAGNOSING SYSTEM, UNIT SPACE GENERATING METHOD, PLANT DIAGNOSING METHOD, AND PROGRAM

(71) Applicant: Mitsubishi Hitachi Power Systems, Ltd., Yokohama (JP)

(72) Inventors: Ichiro Nagano, Yokohama (JP); Mayumi Saito, Tokyo (JP); Keiji Eguchi, Tokyo (JP)

(73) Assignee: MITSUBISHI POWER, LTD., Kanagawa (JP)

( * ) Notice: Subject to any disclaimer, the term of this patent is extended or adjusted under 35 U.S.C. 154(b) by 2 days.

(21) Appl. No.: 16/769,738

(22) PCT Filed: Dec. 18, 2018

(86) PCT No.: PCT/JP2018/046545
§ 371 (c)(1),
(2) Date: Jun. 4, 2020

(87) PCT Pub. No.: WO2019/124367
PCT Pub. Date: Jun. 27, 2019

(65) Prior Publication Data
US 2021/0173383 A1 Jun. 10, 2021

(30) Foreign Application Priority Data
Dec. 21, 2017 (JP) .............................. JP2017-245560

(51) Int. Cl.
*G05B 19/418* (2006.01)

(52) U.S. Cl.
CPC ... *G05B 19/4183* (2013.01); *G05B 19/41865* (2013.01); *G05B 19/41885* (2013.01)

(58) Field of Classification Search
CPC .......... G05B 19/4183; G05B 19/41865; G05B 19/41885; G05B 23/024; G05B 23/0221; G05B 23/0224
See application file for complete search history.

(56) References Cited

U.S. PATENT DOCUMENTS

2005/0251321 A1* 11/2005 DeCarlo ............. G01M 15/046
701/114
2007/0265743 A1 11/2007 Kojitani et al.
(Continued)

FOREIGN PATENT DOCUMENTS

JP         63-6601       1/1988
JP      2005-328673    11/2005
(Continued)

OTHER PUBLICATIONS

Written Opinion of The International Searching Authority dated Feb. 26, 2019 in International (PCT) Application No. PCT/JP2018/046545 with English-language translation.
Internaional Search Report dated Feb. 26, 2019 in International (PCT) Application No. PCT/JP2018/046545 with English-language translation.

*Primary Examiner* — Christopher E. Everett
(74) *Attorney, Agent, or Firm* — Wenderoth, Lind & Ponack, L.L.P.

(57) ABSTRACT

A unit space generating device (141) which generates a unit space for use when diagnosing an operating state of a plant on the basis of a Mahalanobis distance is provided with: a sampling data acquiring unit (141A) which acquires a sampling data group comprising a plurality of state quantities of the plant, measured with a fixed period; an adoption determining unit (141C) which, on the basis of an adoption probability calculated each time the sampling data group is acquired, determines whether the sampling data group is to be adopted as a unit space generation data group serving as the basis for a unit space; a unit space generating unit (141D) which generates unit spaces on the basis of a plurality of the
(Continued)

adopted unit space generation data groups; and an output value acquiring unit (141B) which acquires an output value of the plant corresponding to the sampling data group.

8 Claims, 7 Drawing Sheets

(56) References Cited

U.S. PATENT DOCUMENTS

| | | | |
|---|---|---|---|
| 2010/0198555 A1 | 8/2010 | Takahama et al. | |
| 2015/0302042 A1 | 10/2015 | Shirai et al. | |
| 2019/0129042 A1* | 5/2019 | Yanagisawa | G01C 19/5776 |

FOREIGN PATENT DOCUMENTS

| | | |
|---|---|---|
| JP | 2006-39786 | 2/2006 |
| JP | 2007-327937 | 12/2007 |
| JP | 2010-244149 | 10/2010 |
| JP | 2011-90382 | 5/2011 |
| JP | 2011-253491 | 12/2011 |
| JP | 2012-67757 | 4/2012 |
| JP | 2013-101539 | 5/2013 |
| JP | 2014-149840 | 8/2014 |
| JP | 2017-16187 | 1/2017 |
| WO | 2014/080447 | 5/2014 |

\* cited by examiner

UNIT SPACE GENERATING DEVICE, PLANT DIAGNOSING SYSTEM, UNIT SPACE GENERATING METHOD, PLANT DIAGNOSING METHOD, AND PROGRAM

TECHNICAL FIELD

The present invention relates to a unit space generating device, a plant diagnosing system, a unit space generating method, a plant diagnosing method, and a program.

Priority is claimed on Japanese Patent Application No. 2017-245560, filed on Dec. 21, 2017, the content of which is incorporated herein by reference.

BACKGROUND ART

In various types plants, such as a gas turbine power generation plant, a nuclear power generation plant, and a chemical plant, whether or not the plant is normally operated is monitored. Therefore, state quantities, which are respective measured items (temperature and pressure) of the plant, are acquired, and an operation state of the plant is monitored on the basis of the state quantities.

For example, PTL 1 discloses a technique of determining whether or not an operation state of a plant is normal on the basis of a Mahalanobis distance.

CITATION LIST

Patent Literature

[PTL 1] Japanese Unexamined Patent Application Publication No. 2012-67757

SUMMARY OF INVENTION

Technical Problem

In the related art, a certain number of pieces of data is sampled from data including state quantities collected in a certain period, and a data mass (unit space) which serves as reference for determining the operation state is generated.

However, for example, in the plant that has been used for a long period of time, a value of the Mahalanobis distance increases in some cases due to a replacement time of consumable components even when the operation state is normal. In this case, it is necessary for a manager of the plant to update a unit space each time. In addition, even when the operation state of the plant is normal, it is mistakenly detected that there is an abnormality when a load has changed. In order to reduce the occurrence of such mistaken detection, it is necessary to generate a different unit space for each load band (for example, a "starting operation period" and a "rated speed operation period") in the related art. As described above, in the related art, work of generating and updating a plurality of unit spaces is complicated, and thus it is difficult to reduce costs required for monitoring work of the plant.

In addition, in a case where data is sampled at a fixed timing when generating a unit space, a bias is likely to occur in data configuring the unit space. When the operation state of the plant is diagnosed on the basis of such a unit space, there is a possibility of hyper-sensitively responding to a change in a state quantity and mistakenly detecting that it is an abnormal state even though the operation state of the plant is normal.

The present invention is devised in view of such problems, and an object thereof is to provide a unit space generating device, a plant diagnosing system, a unit space generating method, a plant diagnosing method, and a program that can reduce the occurrence of mistaken detection of an abnormal state at the time of a load change.

Solution to Problem

In order to solve the problems, the present invention adopts the following means.

According to a first aspect of the present invention, there is provided a unit space generating device that generates a unit space used in a case of diagnosing an operation state of a plant on the basis of a Mahalanobis distance. The unit space generating device includes a sampling data acquisition unit that acquires a sampling data group including a plurality of state quantities of the plant, which are measured for each fixed cycle, an adoption determination unit that determines whether or not to adopt the sampling data group as a unit space generation data group, which is based on the unit space, on the basis of an adoption probability calculated each time the sampling data group is acquired, a unit space generation unit that generates the unit space on the basis of a plurality of the adopted unit space generation data groups, and an output value acquisition unit that acquires an output value of the plant corresponding to the sampling data group. The adoption determination unit calculates the adoption probability such that the sampling data group at a point where an absolute value of at least one of a change rate and a change amount of the acquired output value is large is likely to be adopted. The adoption determination unit raises the adoption probability as the absolute value of at least one of the change rate and the change amount of the acquired output value increases.

By doing so, the unit space generating device can suppress a bias of the sampling data group to be adopted as the unit space generation data group, and can generate the unit space for obtaining a value of the robust Mahalanobis distance with respect to a change in the state quantities (load state). That is, the unit space generating device can generate a unit space that can reduce the occurrence of mistaken detection of an abnormal state at the time of a load change. Accordingly, since the unit space generating device can generate a unit space that can respond to various load states without generating a unit space that varies according to a load band, it is possible to reduce costs for generating, updating, and managing the unit space. In addition, the adoption determination unit can make it easier to adopt the sampling data group acquired when the change amount of the output value is large as the unit space generation data group while suppressing a bias and arbitrariness when adopting the sampling data group. Accordingly, the unit space generating device can generate a unit space that can reduce the occurrence of mistaken detection of an abnormal state when the change amount of the output value is large, that is, at a time of a load change.

According to a second aspect of the present invention, in the unit space generating device according to the first aspect, the change rate is represented by an absolute value of a second derivative of the output value.

According to a third aspect of the present invention, in the unit space generating device according to the first or second aspect, the change amount is represented by an absolute value of a first derivative of the output value.

According to a fourth aspect of the present invention, there is provided a plant diagnosing system that diagnoses an operation state of a plant. The plant diagnosing system includes a Mahalanobis distance calculation unit that calculates a Mahalanobis distance on the basis of a state quantity of the plant acquired in a case of diagnosing the operation state of the plant and a plant state determination unit that determines whether or not the operation state of the plant is normal on the basis of a unit space and the Mahalanobis distance. The unit space is generated using the unit space generating device according to any one of the first to third aspects.

By doing so, the unit space generating device can suppress a bias of the sampling data group to be adopted as the unit space generation data, and can generate a unit space for obtaining a value of a robust Mahalanobis distance with respect to a change in the state quantity (load state). In addition, since the plant state determination unit determines whether or not the operation state of the plant is normal on the basis of such a unit space, it is possible to suppress mistakenly determining that the plant is in an abnormal state for hyper-sensitively responding to a change in the load state of the plant.

According to a fifth aspect of the present invention, there is provided a unit space generating method of generating a unit space used in a case of diagnosing an operation state of a plant on the basis of a Mahalanobis distance. The unit space generating method includes a sampling data acquisition step of acquiring a sampling data group of a state quantity of the plant, which is measured for each fixed cycle, an adoption determination step of determining whether or not to adopt the sampling data group as a unit space generation data group, which is based on the unit space, on the basis of an adoption probability calculated each time the sampling data group is acquired, a unit space generation step of generating the unit space on the basis of a plurality of the adopted unit space generation data groups, and a step of acquiring an output value of the plant corresponding to the sampling data group. In the adoption determination step, the adoption probability is calculated such that the sampling data group at a point where an absolute value of at least one of a change rate and a change amount of the acquired output value is large is likely to be adopted, and the adoption probability is raised as the absolute value of at least one of the change rate and the change amount of the acquired output value increases.

According to a sixth aspect of the present invention, there is provided a plant diagnosing method of diagnosing an operation state of a plant. The plant diagnosing method includes a Mahalanobis distance calculation step of calculating a Mahalanobis distance on the basis of a state quantity of the plant acquired in a case of diagnosing the operation state of the plant and a plant state determination step of determining whether or not the operation state of the plant is normal on the basis of a unit space and the Mahalanobis distance. The unit space is generated using the unit space generating method according to the fifth aspect.

According to a seventh aspect of the present invention, there is provided a program that causes a computer of a unit space generating device, which generates a unit space used in a case of diagnosing an operation state of a plant on the basis of a Mahalanobis distance, to function. The program causes the computer to execute a sampling data acquisition step of acquiring a sampling data group of a state quantity of the plant, which is measured for each fixed cycle, an adoption determination step of determining whether to adopt the sampling data group as a unit space generation data group, which is based on the unit space, on the basis of an adoption probability calculated each time the sampling data group is acquired, a unit space generation step of generating the unit space on the basis of a plurality of the adopted unit space generation data groups, and a step of acquiring an output value of the plant corresponding to the sampling data group. In the adoption determination step, the adoption probability is calculated such that the sampling data group at a point where an absolute value of at least one of a change rate and a change amount of the acquired output value is large is likely to be adopted, and the adoption probability is raised as the absolute value of at least one of the change rate and the change amount of the acquired output value increases.

According to an eighth aspect of the present invention, there is provided a program that causes a computer of a plant diagnosing system which diagnoses an operation state of a plant to function. The program causes the computer to execute a Mahalanobis distance calculation step of calculating a Mahalanobis distance on the basis of a state quantity of the plant acquired in a case of diagnosing the operation state of the plant and a plant state determination step of determining whether or not the operation state of the plant is normal on the basis of a unit space and the Mahalanobis distance. The unit space is generated using the program according to the seventh aspect.

Advantageous Effects of Invention

In the unit space generating device, the plant diagnosing system, the unit space generating method, the plant diagnosing method, and the program which are described above, the occurrence of mistaken detection of an abnormal state at the time of a load change can be reduced.

DESCRIPTION OF EMBODIMENTS

Hereinafter, a plant diagnosing system 10 according to an embodiment of the present invention will be described with reference to FIGS. 1 to 8.

(Overview of Plant Diagnosing System)

Figure 1:
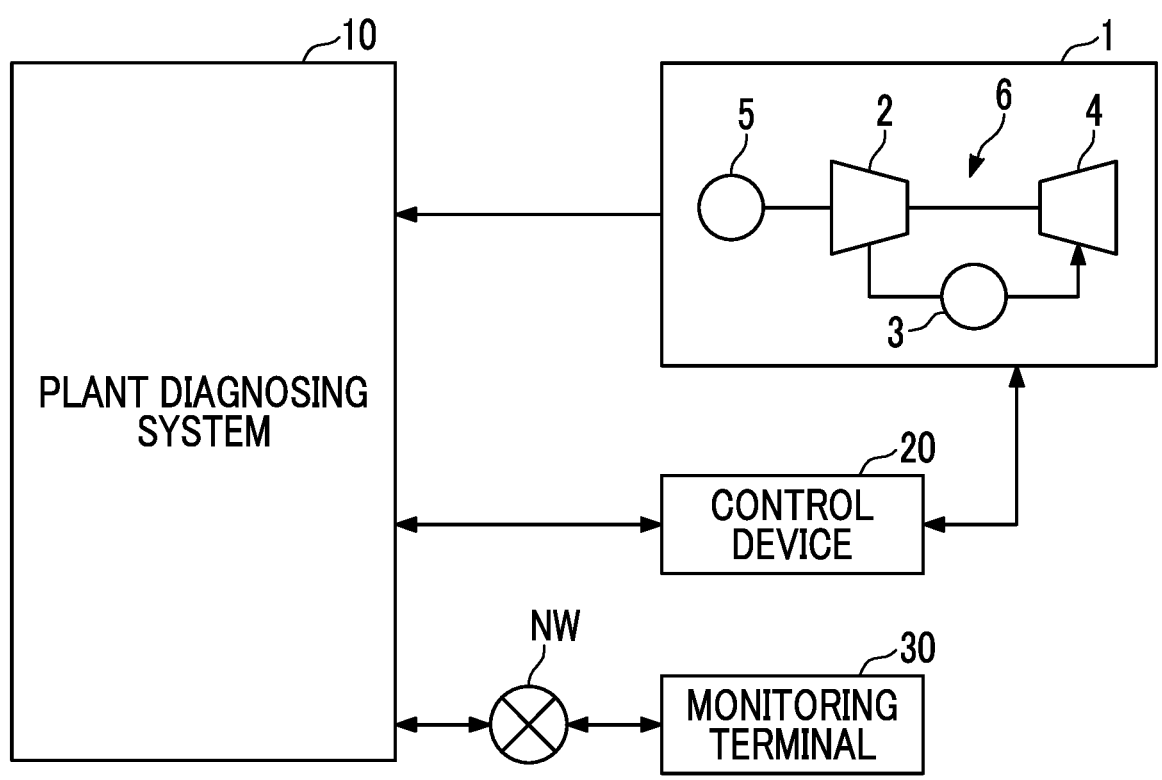
FIG. 1 is a schematic diagram of a plant diagnosing system according to an embodiment of the present invention.

FIG. 1 is a schematic diagram of the plant diagnosing system according to the embodiment of the present invention.

As shown in FIG. 1, the plant diagnosing system 10 according to the embodiment acquires a state quantity of each part of a plant 1 and diagnoses whether or not an operation state is normal.

In addition, the plant diagnosing system 10 is connected to at least one of a control device 20 for controlling the operation state of the plant 1 and a monitoring terminal 30. When diagnosing whether or not the operation state of the plant 1 is normal, the plant diagnosing system 10 transmits the diagnosis result to the control device 20 and the monitoring terminal 30.

The control device 20 is a device for controlling an operation of the plant 1. The control device 20 may display a diagnosis result received from the plant diagnosing system 10 on a display unit (not shown). The manager of the plant 1 monitors the operation state of the plant 1 with reference to the display unit, and controls the operation of the plant 1 via the control device 20 in a case where the diagnosis result indicates that the operation state is abnormal. The control device 20 may automatically control the plant 1 (for example, decrease or stop output of the plant 1) on the basis of the diagnosis result.

The monitoring terminal 30 is a device for the manager at a remote location to monitor the operation state of the plant 1, and is, for example, a server, a tablet, or the like connected via a network NW. The monitoring terminal 30 outputs the diagnosis result received from the plant diagnosing system 10 through an output unit, such as a monitor and a speaker, to notify the manager of whether or not an abnormality has occurred in the plant 1.

The plant 1, which is a diagnosis target, is, for example, a gas turbine power generation plant.

The plant 1 drives a generator 5 by a gas turbine 6 to generate power. The gas turbine 6 includes a compressor 2, a combustor 3, and a turbine 4 for rotating the compressor 2. Air sucked from a suction port of the compressor 2 is compressed by the compressor 2, thereby becoming high-pressure and high-temperature air to be introduced into the combustor 3. In the combustor 3, fuel is supplied to the high-pressure and high-temperature air to be combusted. Then, a high-temperature and high-pressure combustion gas generated as the combustor 3 combusts the fuel is supplied to the turbine 4, and the turbine 4 is driven to be rotated. In addition, the gas turbine 6 and the generator 5 are connected to each other by a rotating shaft (output shaft). Accordingly, output obtained by operating the gas turbine 6 and rotating the turbine 4 is transmitted to the generator 5 through the rotating shaft. As described above, the gas turbine 6 drives the generator 5 to generate power.

Each part of the plant 1 is provided with a sensor for measuring a state quantity for each fixed cycle (for example, one minute). The state quantity includes, for example, the atmospheric temperature, the atmospheric pressure, an air temperature and pressure of the compressor 2 (inlet air temperature, inlet air pressure, outlet air temperature, and outlet air pressure), a fuel pressure, a fuel temperature, and fuel flow rate of the combustor 3, a combustion gas temperature and pressure of the turbine 4 (inlet combustion gas temperature, inlet combustion gas pressure, outlet combustion gas temperature, and outlet combustion gas pressure), output of the generator 5 (generated power, generated current, and generated voltage), and a rotation speed and vibration of the rotating shaft.

In other embodiments, the plant 1 may include a boiler instead of the gas turbine 6. In addition, the plant 1 may be a nuclear power generation plant, a chemical plant, or the like.

Further, although a form in which the plant diagnosing system 10 is connected to one plant 1 is shown in the example of FIG. 1, the present invention is not limited thereto. In other embodiments, the plant diagnosing system 10 may be connected to a plurality of plants and diagnose an operation state of each plant.

(Functional Configuration of Plant Diagnosing System)

Figure 2:
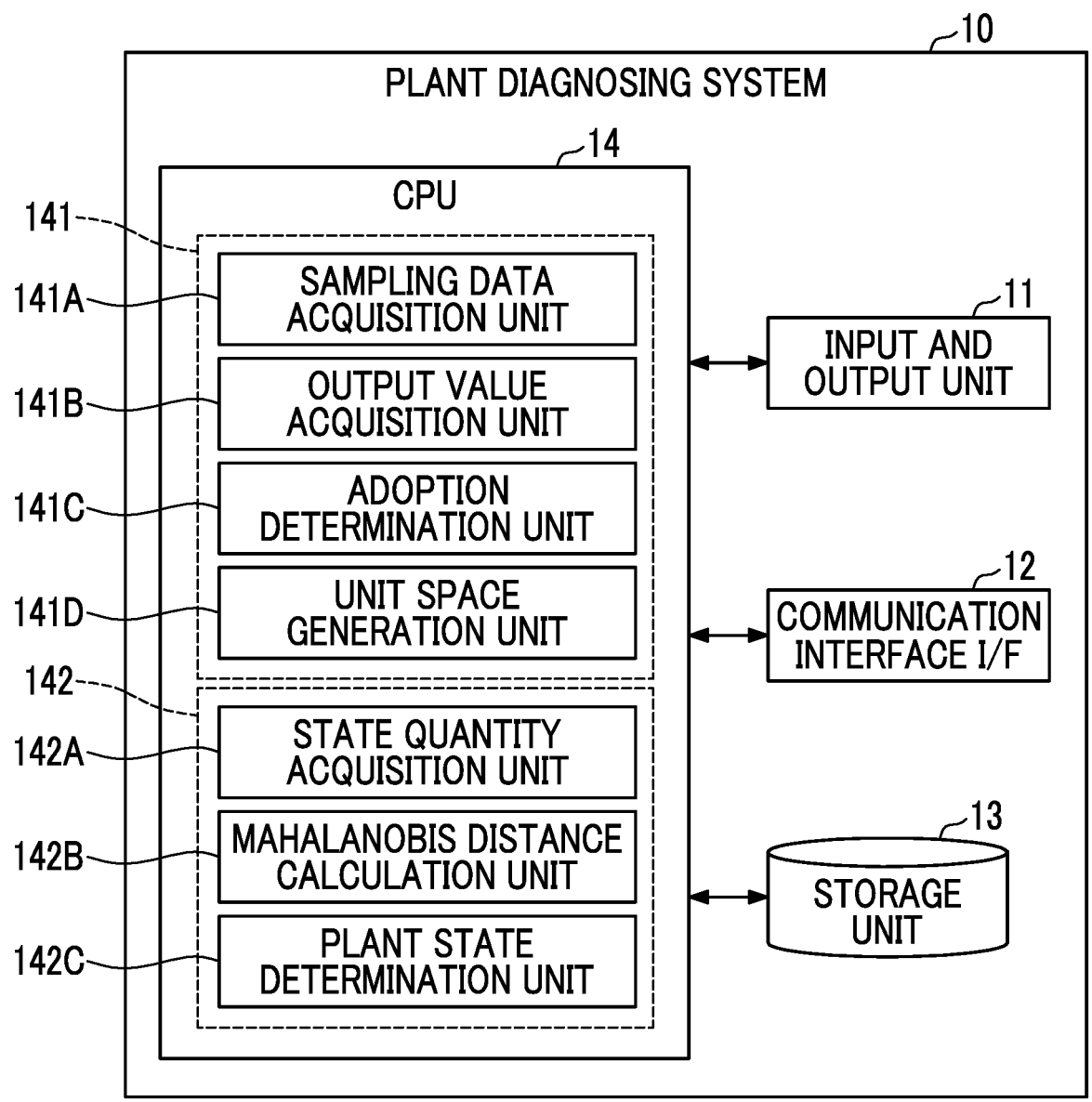
FIG. 2 is a diagram showing a functional configuration of the plant diagnosing system according to the embodiment of the present invention.

FIG. 2 is a diagram showing a functional configuration of the plant diagnosing system according to the embodiment of the present invention. The plant diagnosing system 10 according to the embodiment diagnoses whether or not the operation state of the plant 1 is normal using the Mahalanobis-Taguchi method (MT method).

As shown in FIG. 2, the plant diagnosing system 10 includes an input and output unit 11, a communication interface (I/F) 12, a storage unit 13, and a CPU 14.

The input and output unit 11 receives state quantities of the plant 1 from a plurality of sensors of the plant 1 and inputs the state quantities to the CPU 14. In addition, the diagnosis result of the diagnosed plant 1 in the CPU 14 is transmitted to the control device 20.

The communication I/F 12 transmits the diagnosis result of the diagnosed plant 1 in the CPU 14 to the monitoring terminal 30 via the network NW.

The storage unit 13 stores the state quantities of the plant 1 received via the input and output unit 11 and data generated in various processes in the CPU 14.

The CPU 14 is a processor that controls the plant diagnosing system 10.

The CPU 14 functions as a unit space generating function unit 141 (unit space generating device) and a plant diagnosing function unit 142 (plant diagnosing device) by operating in accordance with a program prepared in advance.

The unit space generating function unit 141 generates a unit space used when diagnosing the operation state of the plant 1 on the basis of a Mahalanobis distance.

A unit space is an aggregate of data that is used as a criterion when determining whether or not the operation state of the plant 1 is normal. In the embodiment, a unit space is generated based on a plurality of state quantities collected when the operation state of the plant 1 is normal.

The unit space generating function unit 141 has a sampling data acquisition unit 141A, an output value acquisition unit 141B, an adoption determination unit 141C, and a unit space generation unit 141D.

The sampling data acquisition unit 141A acquires a sampling data group of state quantities of the plant 1, which are measured for each fixed cycle (for example, at an interval of one minute). In addition, the sampling data acquisition unit 141A stores and accumulates the acquired sampling data group in the storage unit 13.

The sampling data group is obtained by collecting a plurality of state quantities received from the plant 1 as one bundle for each cycle.

The output value acquisition unit 141B acquires an output value of the plant 1 corresponding to a sampling data group. The output value includes, for example, power (MW) generated by the gas turbine 6 (generator 5) of the plant 1, an exhaust gas pressure value, a pressure regulating valve angle, and a flow regulating valve angle.

The adoption determination unit 141C determines to adopt a sampling data group as a unit space generation data group based on a unit space with a predetermined adoption probability.

In addition, the adoption determination unit 141C raises the adoption probability as at least one of a change amount and a change rate of the output value of the plant 1 increases.

The unit space generation unit 141D generates a unit space on the basis of a plurality of unit space generation data groups adopted in the past. In addition, the unit space generation unit 141D stores the generated unit space in the storage unit 13.

The plant diagnosing function unit 142 diagnoses the operation state of the plant 1 on the basis of the Mahalanobis distance.

The plant diagnosing function unit 142 has a state quantity acquisition unit 142A, a Mahalanobis distance calculation unit 142B, and a plant state determination unit 142C.

The state quantity acquisition unit 142A acquires state quantities of the plant 1 at a point in time when diagnosing the operation state of the plant 1.

The Mahalanobis distance calculation unit 142B calculates a Mahalanobis distance on the basis of the state quantities of the plant 1 acquired by the state quantity acquisition unit 142A.

The Mahalanobis distance indicates a degree of deviation between the operation state of the plant 1 at the time of diagnosis and the operation state of the plant 1 at normal times. The Mahalanobis distance is a distance that is weighted according to a variance and a correlation of state quantities for a unit space, and has a larger value as similarity with a data group for the unit space is lower.

The plant state determination unit 142C determines whether or not the operation state of the plant 1 is normal on the basis of the unit space stored in the storage unit 13 and the Mahalanobis distance.

(Process Flow of Unit Space Generating Function Unit)

Figure 3:
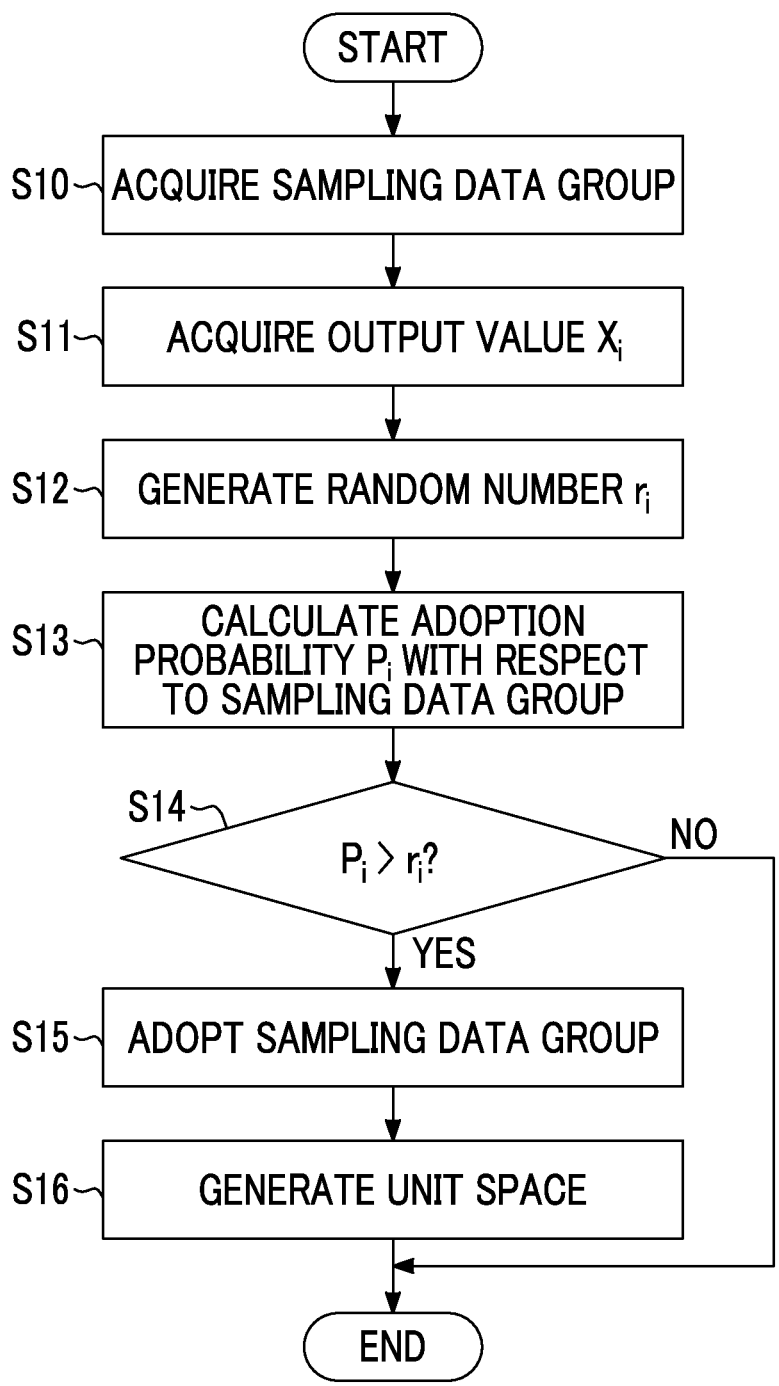
FIG. 3 is a first flowchart showing an example of a unit space generation process according to the embodiment of the present invention.

FIG. 3 is a first flowchart showing an example of a unit space generation process according to the embodiment of the present invention.

Figure 4:
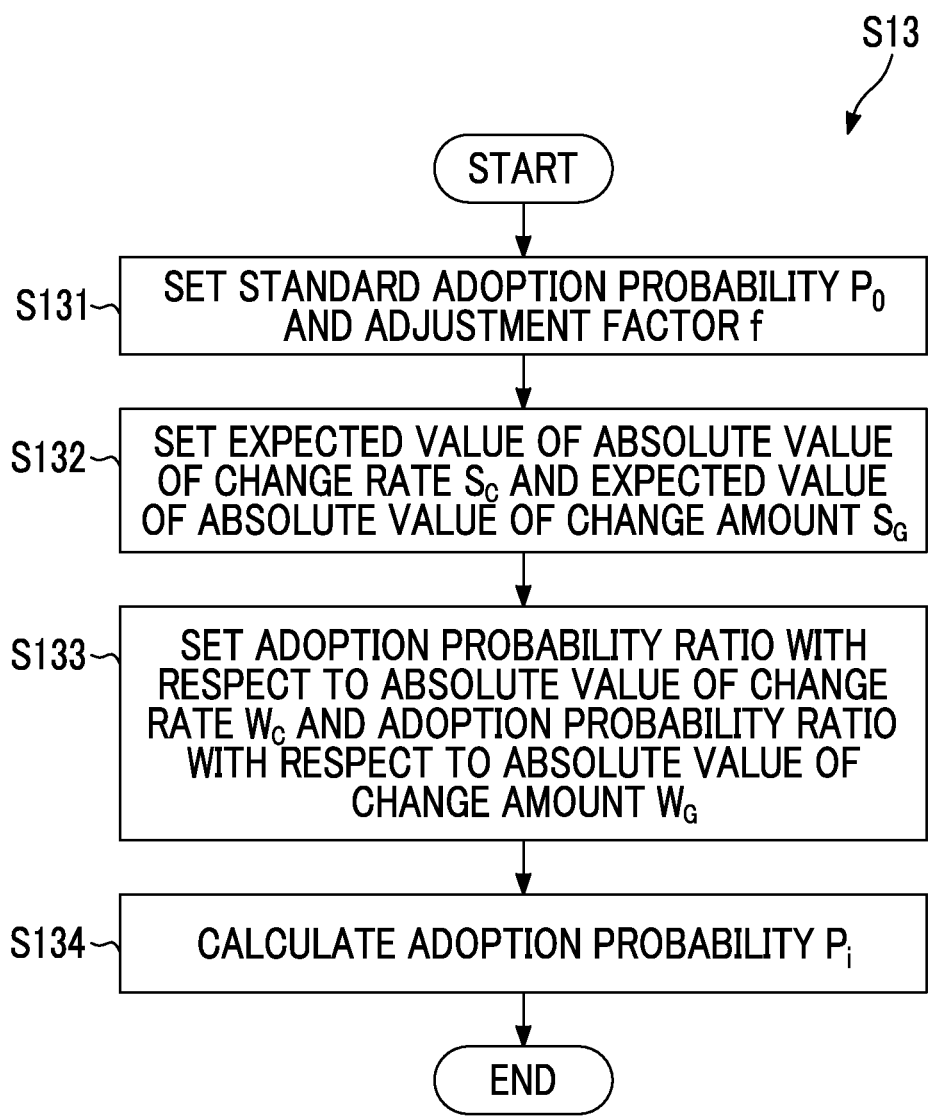
FIG. 4 is a second flowchart showing an example of the unit space generation process according to the embodiment of the present invention.

FIG. 4 is a second flowchart showing an example of the unit space generation process according to the embodiment of the present invention.

Figure 5:
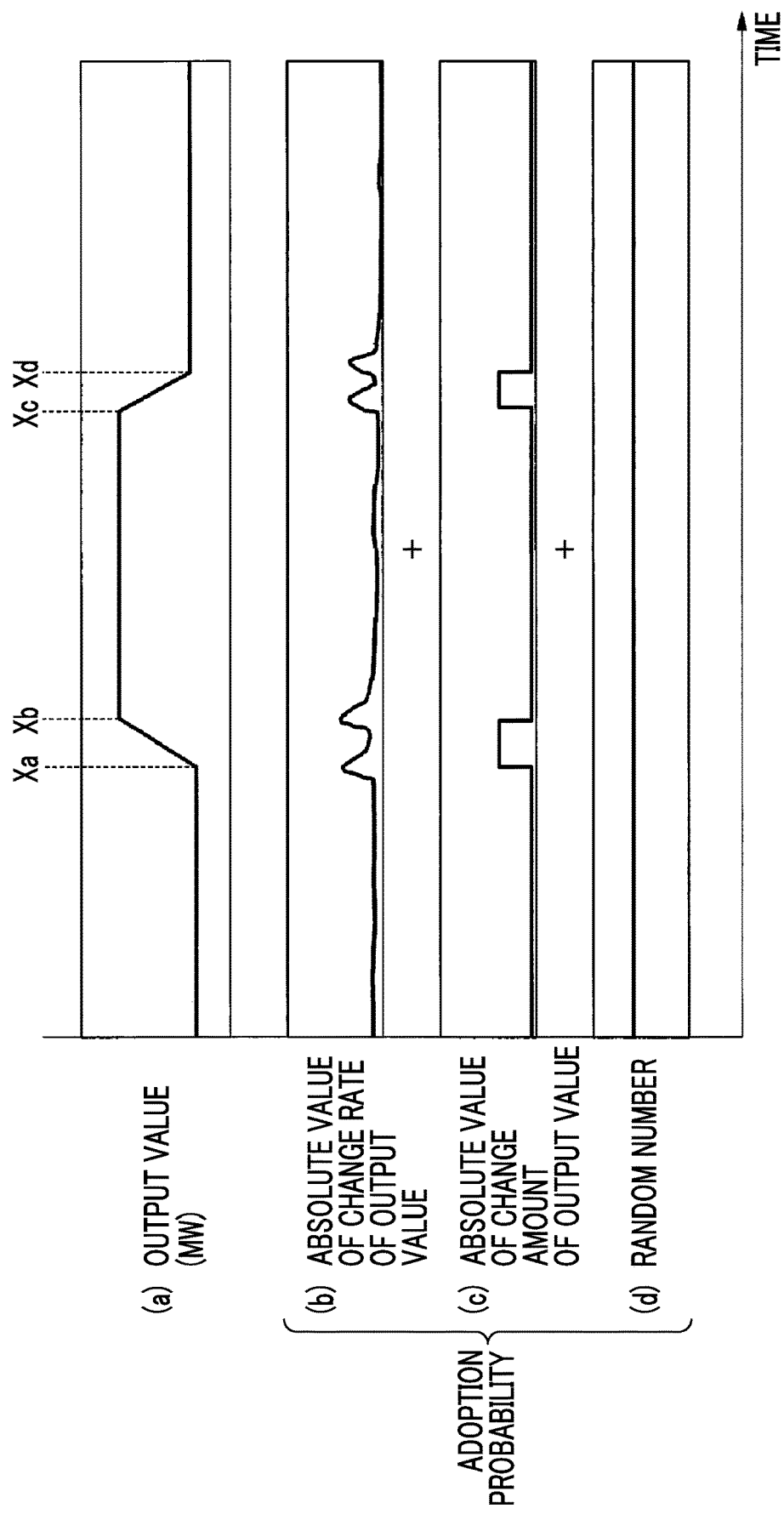
FIG. 5 is a diagram showing an example of a process for an adoption determination unit according to the embodiment of the present invention.

FIG. 5 is a diagram showing an example of a process for the adoption determination unit according to the embodiment of the present invention.

Hereinafter, an example of the unit space generation process for the unit space generating function unit 141 will be described with reference to FIGS. 3 to 5.

As shown in FIG. 3, first, the sampling data acquisition unit 141A receives a plurality of state quantities from the plant 1 and acquires a sampling data group that is a bundle of the plurality of state quantities (Step S10). In addition, the sampling data acquisition unit 141A stores and accumulates the acquired sampling data group in the storage unit 13.

Next, the output value acquisition unit 141B acquires an output value $X_i$ of the plant 1 corresponding to a sampling data group (Step S11).

The output value $X_i$ is, for example, power (MW) generated by the gas turbine 6 (generator 5) of the plant 1, an exhaust gas pressure value, a pressure regulating valve angle, and a flow regulating valve angle.

Next, the adoption determination unit 141C generates a random number $r_i$ (Step S12).

The random number $r_i$ is, for example, a uniform random number generated in a section from "0" to "1".

Next, the adoption determination unit 141C calculates an adoption probability $P_i$ with respect to the sampling data group (Step S13).

In the related art, a unit space is generated by adopting the acquired sampling data group as a unit space generation data group for each predetermined time (for example, four hours). However, in a case where a timing of adopting the sampling data group is fixed as described above, a similar sampling data group is adopted in a biased manner, and thus there is a possibility that a unit space, in which changes in the state quantities of the plant 1 are likely to be excessively detected (mistakenly determined as an abnormal state), is generated.

In addition, as shown in (a) of FIG. 5, load changes, that is, change points (Xa to Xb and Xc to Xd) where an output value changes are shown in some cases during the operation of the plant 1. In a plant that is operated so that such load changes occur periodically, a timing when a sampling data group is extracted and a timing when a change point is shown do not match each other, and thus there is a possibility that the sampling data group at the change point is not adopted as a unit space generation data group. In this case, when a load change has occurred, there is a high possibility that a load is mistakenly determined to be abnormal even though the load is actually normal. For this reason, the adoption determination unit 141C according to the embodiment suppresses a bias of a sampling data group to be adopted as a unit space generation data group, calculates the adoption probability $P_i$ each time a sampling data group is acquired such that the sampling data group at the change point, which is unlikely to be adopted in the related art, is adopted, and determines whether or not to adopt the sampling data group.

Specifically, the adoption determination unit 141C calculates the adoption probability $P_i$ in accordance with procedure shown in FIG. 4.

As shown in FIG. 4, the adoption determination unit 141C sets a "standard adoption probability $P_0$" and an "adjustment factor f" for adjusting a timing when a unit space is generated (updated) (Step S131).

The "standard adoption probability $P_0$" is a value that defines a level of probability to be adopted for all sampling data groups. For example, the value of the "standard adoption probability $P_0$" is set such that a sampling data group is adopted approximately once every four hours.

The "adjustment factor f" is represented by, for example, an integer of "1" to "10". The larger the numerical value, the earlier a timing when a unit space is generated (update speed) (the higher the adoption probability of a sampling data group). In a case where it is necessary to newly generate a unit space, such as when a new plant is started and when a periodic plant inspection is performed, a large value (for example, "10") is set such that a unit space is generated in a short period of time.

In the embodiment, the adoption determination unit 141C reads and sets values of the "standard adoption probability $P_0$" and the "adjustment factor f" which are stored in the storage unit 13 in advance. The manager of the plant 1 may change the values via the control device 20 or the monitoring terminal 30.

Next, the adoption determination unit 141C sets an "expected value of an absolute value of a change rate of an output value $S_C$" and an "expected value of an absolute value of a change amount of an output value $S_G$" (Step S132).

For example, a change rate of an output value is represented by an absolute value of the second derivative of the output value as shown in (b) of FIG. 5. The adoption determination unit 141C sets an average value of the change rate of the output value acquired from a sampling data group of the plant 1 accumulated in the past as the "expected value of an absolute value of a change rate of an output value $S_C$".

For example, a change amount of an output value is represented by an absolute value of a gradient of the first derivative of the output value as shown in (c) of FIG. 5. The adoption determination unit 141C sets an average value of a change amount of an output value acquired from the sampling data group of the plant 1 accumulated in the past as the "expected value of an absolute value of a change amount of an output value $S_G$".

Next, the adoption determination unit 141C sets an "adoption probability ratio with respect to an absolute value of a change rate of an output value $W_C$" and an "adoption probability ratio with respect to an absolute value of a change amount of an output value $W_G$" (Step S133).

When calculating the adoption probability $P_i$, the "adoption probability ratio with respect to an absolute value of a change rate of an output value $W_C$" and the "adoption probability ratio with respect to an absolute value of a change amount of an output value $W_G$" are weights given to the absolute values of the change rate and the change amount of the output value, and are represented, for example, by a percentage such as "20%".

In the embodiment, the adoption determination unit 141C reads and sets values of the "adoption probability ratio with respect to an absolute value of a change rate of an output value $W_C$" and the "adoption probability ratio with respect to an absolute value of a change amount of an output value $W_G$" which are stored in the storage unit 13 in advance. The manager of the plant 1 may change the values via the control device 20 or the monitoring terminal 30.

Next, the adoption determination unit 141C calculates the adoption probability $P_i$ on the basis of the "standard adoption probability $P_0$", the "adjustment factor f", the "expected value of an absolute value of a change rate of an output value $S_C$", the "expected value of an absolute value of a change amount of an output value $S_G$", the "adoption probability ratio with respect to an absolute value of a change rate of an output value $W_C$", and the "adoption probability ratio with respect to an absolute value of a change amount of an output value $W_G$", which are set in Steps S131 to S133, and the output value $X_i$ acquired in Step S11 of FIG. 3 (Step S134).

Although any method may be adopted as a calculation method for acquiring the adoption probability $P_i$, it is desirable to adopt a calculation formula that at least has a large value at a singular point of the output value. For example, a parameter value is set (for example, adjusting values of the "adoption probability ratio with respect to an absolute value of a change rate of an output value $W_C$" and the "adoption probability ratio with respect to an absolute value of a change amount of an output value $W_G$" which are set in Step S133) and calculated such that a point where a change rate and a change amount of an output value of FIG. 5 are large (for example, a point where at least one value of the "expected value of an absolute value of a change rate of an output value $S_C$" and the "expected value of an absolute value of a change amount of an output value $S_G$", which are set in Step S132, is large) can be adopted at an expected percentage.

Next, as shown in FIG. 3, the adoption determination unit 141C determines whether or not the adoption probability $P_i$ with respect to the sampling data group is greater than the random number $r_i$ (Step S14).

In a case where the adoption probability $P_i$ with respect to the sampling data group is smaller than the random number $r_i$ (Step S14: NO), the adoption determination unit 141C terminates the process without adopting the sampling data group as a unit space generation data group.

On the other hand, in a case where the adoption probability $P_i$ with respect to the sampling data group is greater than the random number $r_i$ (Step S14: YES), the adoption determination unit 141C adopts the sampling data group as a unit space generation data group (Step S15).

By doing so, as shown in FIG. 5, as at least one of the "absolute value of a change rate of an output value" and the "absolute value of a change amount of an output value" increases while an integrated value of the adoption probability $P_i$ is kept constant, the adoption probability $P_i$ can be raised.

Next, when the sampling data group is adopted as a unit space generation data group, the unit space generation unit 141D generates a new unit space on the basis of the newly adopted unit space generation data group and the unit space generation data group adopted in the past (Step S16).

In the embodiment, the unit space generation unit 141D generates a unit space on the basis of a predetermined number of unit space generation data groups adopted in a predetermined measurement period (for example, a period which is eight weeks earlier from a point in time when the unit space is generated). In a case where the number of adopted unit space generation data groups exceeds the predetermined number, the unit space generation unit 141D deletes the oldest unit space generation data group and generates a new unit space.

In addition, the unit space generation unit 141D stores the newly generated unit space in the storage unit 13. At this time, the unit space generation unit 141D may perform an update by overwriting the past unit space with the newly generated unit space.

The unit space generating function unit 141 repeatedly executes the process described above for each fixed cycle (cycle in which state quantities measured by the sensors of the plant 1).

(Process Flow of Plant Diagnosing Function Unit)

Figure 6:
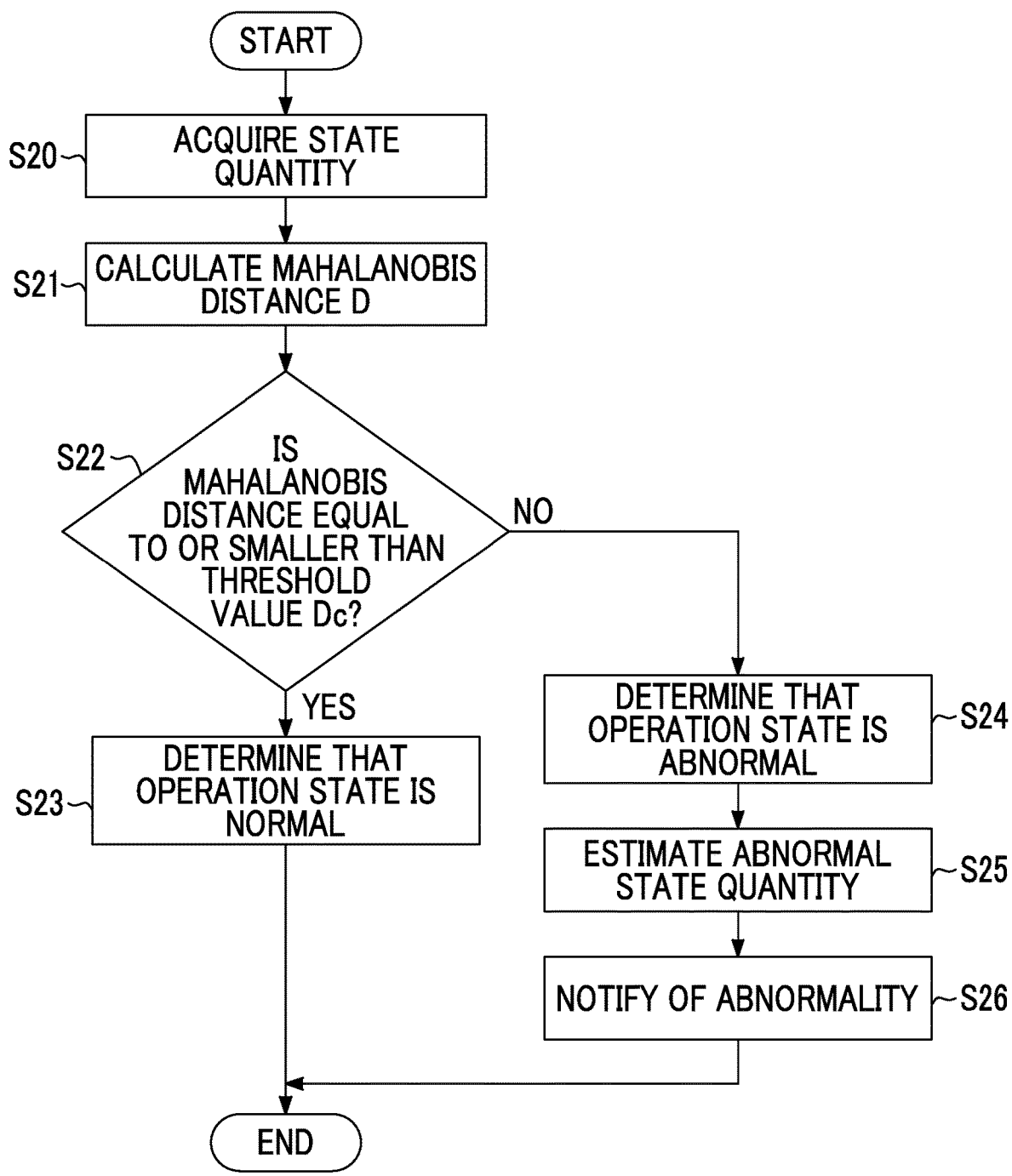
FIG. 6 is a flowchart showing an example of a plant diagnosis process according to the embodiment of the present invention.

FIG. 6 is a flowchart showing an example of a plant diagnosis process according to the embodiment of the present invention.

Figure 7:
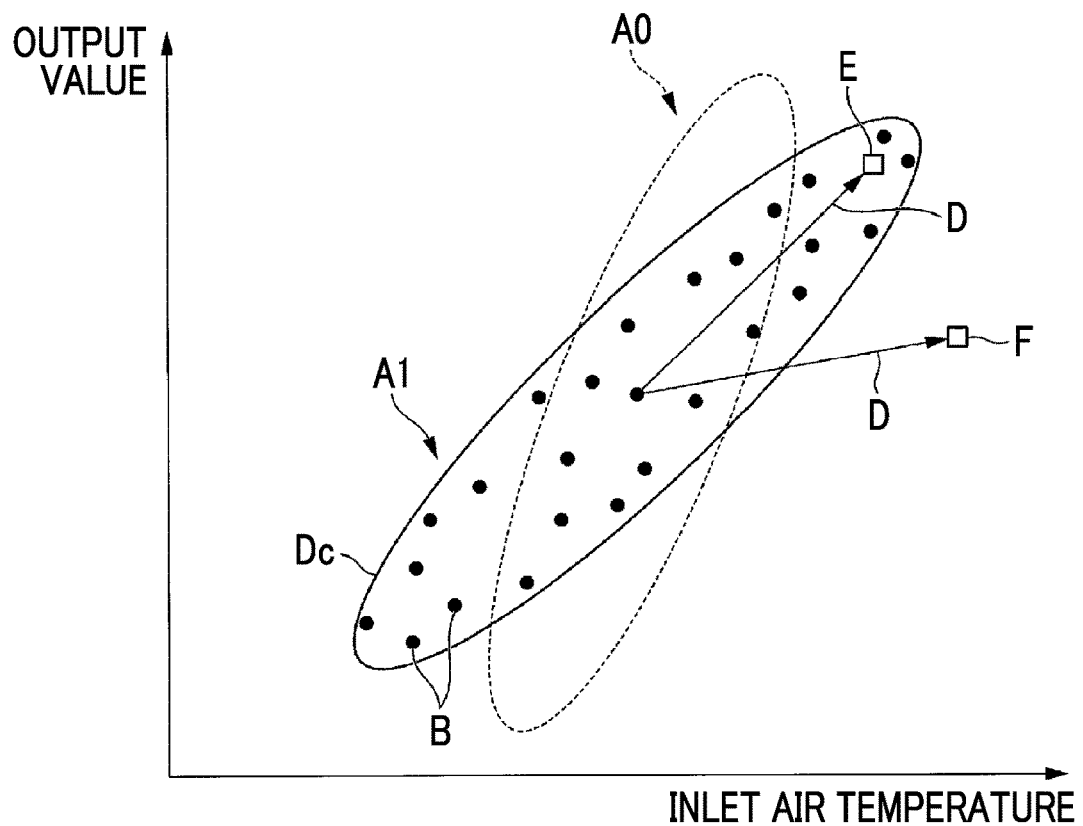
FIG. 7 is a graph showing an example of a unit space according to the embodiment of the present invention.

FIG. 7 is a graph showing an example of a unit space according to the embodiment of the present invention.

Hereinafter, an example of the plant diagnosis process for the plant diagnosing function unit 142 will be described with reference to FIGS. 6 to 7.

As shown in FIG. 6, first, the state quantity acquisition unit 142A acquires the current state quantities of the plant 1 (Step S20).

At this time, the state quantity acquisition unit 142A may acquire the latest state quantity out of state quantities (sampling data groups) accumulated in the storage unit 13.

Next, the Mahalanobis distance calculation unit 142B calculates a Mahalanobis distance D (FIG. 7) on the basis of the state quantities acquired by the state quantity acquisition unit 142A (Step S21).

The Mahalanobis distance calculation unit 142B calculates the Mahalanobis distance D using a known technique (for example, the technique disclosed in PTL 1).

Next, the plant state determination unit 142C determines whether or not the Mahalanobis distance D is equal to or smaller than a threshold value Dc (FIG. 7) (Step S22).

FIG. 7 is an example in which a unit space A1 generated by the unit space generation unit 141D in the unit space generation process described above (FIG. 3) and a unit space A0 generated by the related art are two-dimensionally shown through a simulation. In the example of FIG. 7, the unit space generation unit 141D generates the unit space A1 with an output value of the plant 1 (power generated by the generator 5) and an inlet air temperature of the compressor 2 as a unit space generation data group. B indicates a state quantity, that is, measured values of the output value of the plant 1 and the inlet air temperature of the compressor 2. In addition, a solid line indicating the unit space A1 has the threshold value Dc.

In the embodiment, the plant state determination unit 142C reads the threshold value Dc stored in the storage unit 13 in advance to perform determination. The threshold value Dc may be set as appropriate to a value larger than a maximum value of the unit space A1, for example, or may be set in consideration of characteristics unique to the plant 1 and manufacturing variations.

In a case where the Mahalanobis distance D is equal to or smaller than the threshold value Dc (included in the solid line indicating the unit space A1), for example, just as a "state quantity E" (Step S22: YES), the plant state determination unit 142C determines that the operation state of the plant 1 is normal (Step S23).

On the other hand, in a case where the Mahalanobis distance D is larger than the threshold value (not included in the solid line indicating the unit space A1), for example, just as a "state quantity F" (Step S22: NO), the plant state determination unit 142C determines that the operation state of the plant 1 is abnormal (Step S24).

As described above, there is a high possibility that the sampling data group at the change points (Xa to Xb and Xc to Xd in FIG. 5) is not included as a unit space generation data group in the unit space A0 of the related art. For this reason, for example, in a case where the "state quantity E" is measured at the time of a load change, the "state quantity E" exceeds a range of the unit space A0. Therefore, the operation state of the plant 1 is determined (mistakenly determined) to be abnormal.

However, there is a high possibility that the new unit space A1 generated by the unit space generation unit 141D includes the sampling data group at the change points as a unit space generation data group. For this reason, for example, in a case where the "state quantity E" is measured at the time of a load change, the "state quantity E" is included in a range of the unit space A1. Therefore, the operation state of the plant 1 is correctly determined to be normal.

Next, as shown in FIG. 6, when the plant state determination unit 142C determines that the operation state of the plant 1 is abnormal (Step S24), the plant state determination unit estimates an item of a state quantity which is abnormal (abnormal item) (Step S25).

The plant state determination unit 142C acquires a large SN ratio of the presence or absence of the item by, for example, orthogonal array analysis, and estimates the item of the state quantity that has a high possibility of being abnormal.

Next, the plant state determination unit 142C transmits the Mahalanobis distance D calculated in Step S21 and the abnormal item estimated in Step S25 to at least one of the control device 20 and the monitoring terminal 30, and notifies the manager of the occurrence of an abnormality (Step S26).

The plant diagnosing function unit 142 according to the embodiment may automatically and periodically execute the plant diagnosis process described above, or may execute the plant diagnosis process at a timing designated by the manager via the control device 20 or the monitoring terminal 30.

(Hardware Configuration)

Figure 8:
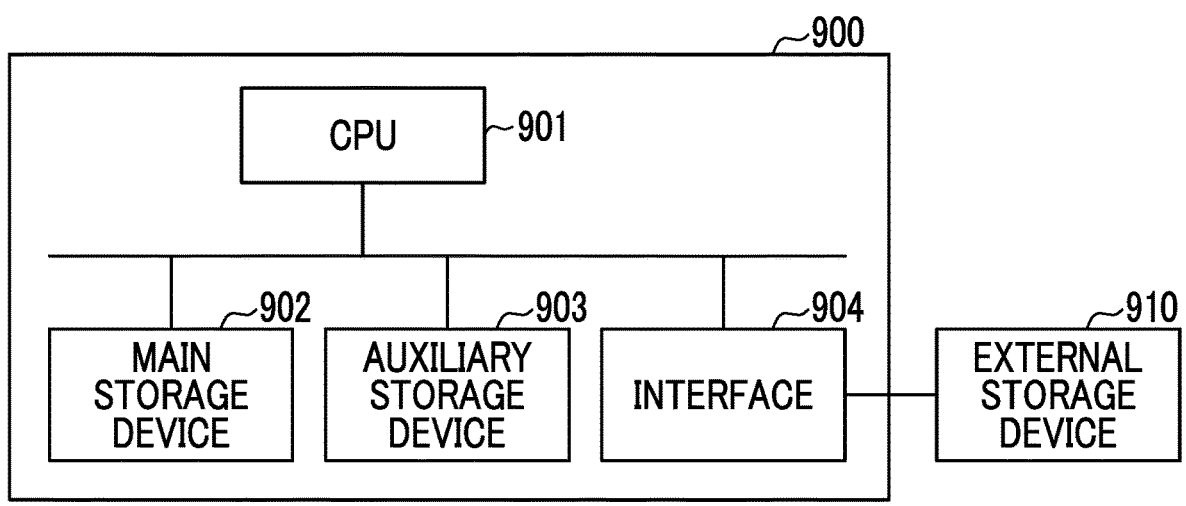
FIG. 8 is a diagram showing an example of a hardware configuration of the plant diagnosing system according to the embodiment of the present invention.

FIG. 8 is a diagram showing an example of a hardware configuration of the plant diagnosing system according to the embodiment of the present invention.

Hereinafter, the hardware configuration of the plant diagnosing system 10 according to the embodiment will be described with reference to FIG. 8.

A computer 900 includes a CPU 901, a main storage device 902, an auxiliary storage device 903, and an interface 904.

The plant diagnosing system 10 described above is mounted on the computer 900. Then, an operation of each part of the plant diagnosing system 10 described above is stored in a form of a program in the auxiliary storage device 903 included in each computer 900. The CPU 901 (CPU 14) reads the program from the auxiliary storage device 903, deploys the program in the main storage device 902, and executes the process in accordance with the program. In addition, the CPU 901 secures, in the main storage device 902, a storage area (storage unit 13) for storing various types of information which is acquired and generated with the process in accordance with the program. In addition, the CPU 901 secures the storage area for storing data, which is being processed, in the auxiliary storage device 903 in accordance with the program.

The computer 900 is connected to an external storage device 910 via the interface 904, and the storage area may be secured in the external storage device 910.

In at least one embodiment, the auxiliary storage device 903 is an example of a non-transitory tangible medium. Other examples of the non-transitory tangible medium include a magnetic disk, a magneto-optical disk, a CD-ROM, a DVD-ROM, and a semiconductor memory which are connected via the interface 904. In addition, in a case where the program is distributed to the computer 900 via a communication line, the computer 900 that has received the program may deploy the program in the main storage device 902 and execute the process.

In addition, the program may be a program for realizing some of the functions described above. Further, the program may be a program that realizes the functions described above in combination with other programs already stored in the auxiliary storage device 903, that is, a so-called difference file (difference program).

(Operational Effects)

As described above, the unit space generating function unit 141 (unit space generating device) according to the embodiment includes the sampling data acquisition unit 141A that acquires a sampling data group of state quantities of the plant 1, which are measured for each fixed cycle, the adoption determination unit 141C that determines to adopt the sampling data group as a unit space generation data group based on a unit space with the predetermined adoption probability $P_i$, and the unit space generation unit 141D that generates a unit space on the basis of a plurality of adopted unit space generation data groups.

By doing so, the unit space generation unit 141D can suppress a bias of the sampling data group to be adopted as a unit space generation data, and can generate a unit space for obtaining a value of a robust Mahalanobis distance with respect to a change in a state quantity (load state). That is, the unit space generation unit 141D can generate a unit space that can reduce the occurrence of mistaken detection of an abnormal state at the time of a load change. Accordingly, since the unit space generation unit 141D can generate a unit space that can respond to various load states without generating a unit space that varies according to a load band, it is possible to reduce costs for generating, updating, and managing a unit space.

In addition, the adoption determination unit 141C determines whether or not to adopt a sampling data group each time a sampling data group is acquired, and in a case where the sampling data group is adopted, the unit space generation unit 141D automatically generates a new unit space. That is, the unit space generating function unit 141 can reduce effort of determining whether it is necessary to update a unit space by the manager of the plant 1 with reference to the Mahalanobis distance by automating work of generating and updating a unit space.

In addition, the unit space generating function unit 141 further includes the output value acquisition unit 141B that acquires an output value of the plant corresponding to a sampling data group. The adoption determination unit 141C raises the adoption probability $P_i$ as a change amount of an acquired output value increases.

By doing so, the adoption determination unit 141C can make it easier to adopt the sampling data group acquired when the change amount of the output value is large as a unit space generation data group while suppressing a bias and arbitrariness when adopting the sampling data group. Accordingly, the unit space generation unit 141D can generate a unit space that can reduce the occurrence of mistaken detection of an abnormal state when a change amount of an output value is large, that is, at a time of a load change.

In addition, the adoption determination unit 141C raises the adoption probability $P_i$ as a change rate of the acquired output value increases.

By doing so, the adoption determination unit 141C can make it easier to adopt the sampling data group acquired when the change rate of the output value is large as a unit space generation data group while suppressing a bias and arbitrariness when adopting the sampling data group. Accordingly, the unit space generation unit 141D can generate a unit space that can reduce the occurrence of mistaken detection of an abnormal state when the change rate of the output value is large, that is, at a time of a load change.

In addition, the adoption determination unit 141C generates the random number $r_i$ each time a sampling data group is acquired, and calculates the adoption probability $P_i$. Then, in a case where the adoption probability $P_i$ is greater than the random number $r_i$, the adoption determination unit 141C determines to adopt the sampling data group as a unit space generation data group.

As described above, since the adoption determination unit 141C uses the random number $r_i$ when determining whether to adopt a sampling data group, a bias of the sampling data group to be adopted as a unit space generation data group can be suppressed particularly in a case where a load is almost constant.

In addition, the plant diagnosing system 10 according to the embodiment includes the sampling data acquisition unit 141A that acquires a sampling data group of state quantities of the plant 1, which are measured for each fixed cycle, the adoption determination unit 141C that determines to adopt the sampling data group as a unit space generation data group based on a unit space with the predetermined adoption probability $P_i$, the unit space generation unit 141D that generates a unit space on the basis of a plurality of adopted unit space generation data groups, the Mahalanobis distance calculation unit 142B that calculates a Mahalanobis distance on the basis of the state quantities of the plant 1 acquired when diagnosing the operation state of the plant 1, and the plant state determination unit 142C that determines whether or not the operation state of the plant 1 is normal on the basis of the unit space and the Mahalanobis distance.

By doing so, the unit space generation unit 141D can suppress a bias of the sampling data group to be adopted as a unit space generation data, and can generate a unit space for obtaining a value of a robust Mahalanobis distance with respect to a change in a state quantity (load state). In addition, since the plant state determination unit 142C determines whether or not the operation state of the plant is normal on the basis of such a unit space, it is possible to suppress mistakenly determining that the plant is in an abnormal state for hyper-sensitively responding to a change in a load state of the plant.

Although the embodiment of the present invention has been described in detail hereinbefore, the present invention is not limited thereto and can somewhat undergo design changes as well without departing from the technical spirit of the present invention.

For example, although an example in which both of the unit space generating function unit 141 (unit space generating device) and the plant diagnosing function unit 142 (plant diagnosing device) function on the CPU 14 has been described in the embodiment described above, the present invention is not limited thereto. In other embodiments, the unit space generating function unit 141 and the plant diagnosing function unit 142 may be configured to function on different CPUs, or may be configured as different devices (computers).

INDUSTRIAL APPLICABILITY

In the unit space generating device, the plant diagnosing system, the unit space generating method, the plant diagnosing method, and the program which are described above, the occurrence of mistaken detection of an abnormal state at the time of a load change can be reduced.

REFERENCE SIGNS LIST 1 plant
10 plant diagnosing system
11 input and output unit
12 communication interface (I/F)
13 storage unit
14 CPU
141 unit space generating function unit (unit space generating device)
141A sampling data acquisition unit
141B output value acquisition unit
141C adoption determination unit
141D unit space generation unit
142 plant diagnosing function unit (plant diagnosing device)
142A state quantity acquisition unit
142B Mahalanobis distance calculation unit
142C plant state determination unit
20 control device
30 monitoring terminal

The invention claimed is:

1. A unit space generating device that generates a unit space used in a case of diagnosing an operation state of a plant on the basis of a Mahalanobis distance, the device comprising:
a sampling data acquisition unit that acquires a sampling data group including a plurality of state quantities of the plant, which are measured for each fixed cycle;

an adoption determination unit that determines to adopt the sampling data group as a unit space generation data group, which is based on the unit space, on the basis of an adoption probability calculated each time the sampling data group is acquired;

a unit space generation unit that generates the unit space on the basis of a plurality of the adopted unit space generation data groups; and an output value acquisition unit that acquires an output value of the plant corresponding to the sampling data group, wherein when a first sampling data group is acquired at a period where a load change is not occurred and a second sampling data group is acquired at a period where a load change is occurred and has a larger absolute value of at least one of a change rate and a change amount of the acquired output value than the first sampling data group, the adoption determination unit calculates the adoption probability such that an adoption probability of the second sampling data group is higher than an adoption probability of the first sampling data group, and calculates the adoption probability by adding a probability ratio with respect to the absolute value of the change rate or the change amount of the acquired output value to a probability in which a value of the probability is set such that the sampling data group is adopted once in a predetermined period.

2. The unit space generating device according to claim 1, wherein the change rate is represented by an absolute value of a second derivative of the output value.

3. The unit space generating device according to claim 1, wherein the change amount is represented by an absolute value of a first derivative of the output value.

4. A plant diagnosing system that diagnoses an operation state of a plant, the system comprising:

a Mahalanobis distance calculation unit that calculates a Mahalanobis distance on the basis of a state quantity of the plant acquired in a case of diagnosing the operation state of the plant; and a plant state determination unit that determines whether or not the operation state of the plant is normal on the basis of a unit space and the Mahalanobis distance, wherein the unit space is generated using the unit space generating device according to claim 1.

5. A unit space generating method of generating a unit space used in a case of diagnosing an operation state of a plant on the basis of a Mahalanobis distance, the method comprising:

a sampling data acquisition step of acquiring a sampling data group of a state quantity of the plant, which is measured for each fixed cycle;

an adoption determination step of determining to adopt the sampling data group as a unit space generation data group, which is based on the unit space, on the basis of an adoption probability calculated each time the sampling data group is acquired;

a unit space generation step of generating the unit space on the basis of a plurality of the adopted unit space generation data groups; and a step of acquiring an output value of the plant corresponding to the sampling data group, wherein in the adoption determination step, when a first sampling data group is acquired at a period where a load change is not occurred and a second sampling data group is acquired at a period where a load change is occurred and has a larger absolute value of at least one of a change rate and a change amount of the acquired output value than the first sampling data group, the adoption probability is calculated such that an adoption probability of the second sampling data group is higher than an adoption probability of the first sampling data group, and the adoption probability is calculated by adding an adoption probability ratio with respect to the absolute value of the change rate or the change amount of the acquired output value to a probability in which a value of the probability is set such that the sampling data group is adopted once in a predetermined period.

6. A plant diagnosing method of diagnosing an operation state of a plant, the method comprising:

a Mahalanobis distance calculation step of calculating a Mahalanobis distance on the basis of a state quantity of the plant acquired in a case of diagnosing the operation state of the plant; and a plant state determination step of determining whether or not the operation state of the plant is normal on the basis of a unit space and the Mahalanobis distance, wherein the unit space is generated using the unit space generating method according to claim 5.

7. A program that causes a computer of a unit space generating device, which generates a unit space used in a case of diagnosing an operation state of a plant on the basis of a Mahalanobis distance, to function, wherein the program is stored in a non-transitory storage device, the program causing the computer to execute:

a sampling data acquisition step of acquiring a sampling data group of a state quantity of the plant, which is measured for each fixed cycle;

an adoption determination step of determining to adopt the sampling data group as a unit space generation data group, which is based on the unit space, on the basis of an adoption probability calculated each time the sampling data group is acquired;

a unit space generation step of generating the unit space on the basis of a plurality of the adopted unit space generation data groups; and a step of acquiring an output value of the plant corresponding to the sampling data group, wherein in the adoption determination step, when a first sampling data group is acquired at a period where a load change is not occurred and a second sampling data group is acquired at a period where a load change is occurred and has a larger absolute value of at least one of a change rate and a change amount of the acquired output value than the first sampling data group, the adoption probability is calculated such that an adoption probability of the second sampling data group is higher than an adoption probability of the first sampling data group, and the adoption probability is calculated by adding an adoption probability ratio with respect to the absolute value of the change rate or the change amount of the acquired output value to a probability in which a value of the probability is set such that the sampling data group is adopted once in a predetermined period.

8. A program that causes a computer of a plant diagnosing system which diagnoses an operation state of a plant to function, the program causing the computer to execute:

a Mahalanobis distance calculation step of calculating a Mahalanobis distance on the basis of a state quantity of the plant acquired in a case of diagnosing the operation state of the plant; and a plant state determination step of determining whether or not the operation state of the plant is normal on the basis of a unit space and the Mahalanobis distance, wherein the unit space is generated using the program according to claim 7.

\* \* \* \* \*